United States Patent [19]

Fujita

[11] Patent Number: 5,078,423
[45] Date of Patent: Jan. 7, 1992

[54] AIR BAG WITH OVERLAPPING SUSPENSION STRINGS

[75] Inventor: Tetsuji Fujita, Hikone, Japan

[73] Assignee: Takata Corporation, Tokyo, Japan

[21] Appl. No.: 601,625

[22] Filed: Oct. 23, 1990

[30] Foreign Application Priority Data

Oct. 24, 1989 [JP] Japan .................................. 1-276291

[51] Int. Cl.⁵ .............................................. B60R 21/28
[52] U.S. Cl. ...................................... 280/743; 280/728
[58] Field of Search ............... 280/743, 728, 731, 742, 280/729, 730; 383/119

[56] References Cited

U.S. PATENT DOCUMENTS

| | | | |
|---|---|---|---|
| 3,879,057 | 4/1975 | Kawashima et al. | 280/743 |
| 3,938,824 | 2/1976 | Patzelt | 280/730 |
| 4,887,842 | 12/1989 | Sato | 280/743 X |
| 4,934,734 | 6/1990 | Takada | 280/743 X |
| 4,966,389 | 10/1990 | Takada | 280/743 |

*Primary Examiner*—Charles A. Marmor
*Assistant Examiner*—Kevin Hurley
*Attorney, Agent, or Firm*—Armstrong, Nikaido, Marmelstein, Kubovcik & Murray

[57] ABSTRACT

The air bag 3 of this invention includes a suspension member 6, which is furnished between the base cloth on the side facing the person in the vehicle and the base cloth to be fixed on the fixed portion of car body or between the former base cloth and the fixed portion of car body. When inflated, the shape of said air bag is maintained in the predetermined shape by said suspension member. The suspension string 6 consists of a plurality of single strings $6_1$ and $6_2$, and these single strings have the sewn portions 6f to be sewn on the base cloth 3a on the side facing to said person in vehicle and all or almost all sewn portions 6f of the single strings are overlapped on each other, and these are sewn together with the base cloth 3b on the side facing to the person in vehicle. This makes it possible to increase the strength of the sewn portions and to effectively cut the base cloth. By overlapping the entire sewn portions, the positioning of single strings can be performed much easier.

3 Claims, 6 Drawing Sheets

AIR BAG WITH OVERLAPPING SUSPENSION STRINGS

BACKGROUND OF THE INVENTION

The present invention relates to an air bag to protect a person in vehicle by inflating with reaction gas from an inflator when the vehicle is collided, and in particular to an air bag provided with a suspension string to maintain the shape of the air bag to the predetermined shape when it is inflated.

The air bag unit installed on a fixed portion of car body in front of the seat in a vehicle plays an important role in protecting persons in the vehicle from injury when they are collided against car body as the air bag is instantaneously inflated by the pressure of reaction gas released from an inflator fixed on steering wheel or dashboard during an emergency such as the collision of the vehicle.

For example, as shown in FIG. 4, the air bag unit comprises an inflator 2, which ejects reaction gas by bringing a gas generating agent to chemical in response to a collision signal from a collision detecting sensor when the deceleration of the vehicle exceeds a certain level, and an air bag 3, which is inflated by the gas ejected from the inflator 2 and the base of which is fixed to the inflator 2. This air bag unit is mounted on a fixed portion of car body, such as the center of the steering wheel 5, by folding the air bag 3 and placing it into a pad 4.

As shown in FIG. 5, the gas generating agent in the inflator 2 is brought into reaction when the vehicle collides, and the air bag 3 is instantaneously inflated by the generated reaction gas. Thus, the air bag 3 receives the person M, who is moved forward by inertia and protects the person M from the collision against the car body. In this case, in order that the air bag does not unnecessarily protrude toward the person M, the shape of the inflated air bag 3 is maintained in the predetermined shape by a suspension member 6 furnished between the base cloth 3a on the side facing to the person M and the base cloth 3b on the fixed portion of car body or between the base cloth 3a and the fixed portion of car body. Thus, it is possible to effectively receive the person M.

As the methods for fixing the suspension member 6 on base cloth 3a on the side facing to the person M, the following three methods have been adopted in the past:

FIG. 6 shows one of such methods. In the Figure, the same components as in FIG. 5 are referred by the same numbers and symbols, and detailed description is not given here.

As shown in FIG. 6, two pieces of catch cloths 7 and 8 are fixed on the base cloth 3a on the side facing to the person M by the sewn portion a in approximately circular shape, and one end of each of 4 single straps 6a, 6a, ..., consituting the suspension member 6, is fixed on 4 suspension member attachments 7a, ..., 8a, ..., of these catch cloths 7 and 8 by the sewn portion b. This method is advantageous in that the strength of the suspension member 6a at the sewn portion b is relatively high.

FIG. 7 shows another of the above methods. The same component as in FIG. 5 are referred by the same member and symbol, and detailed description is not given here.

As shown in FIG. 7, the suspension member 6 consists of a sewn portion 6b at the center of the cloth and 4 connecting legs 6c, 6c, ..., extending in form of a cross in the 4 directions from the sewn portion 6b, and the sewn portion 6b of the suspension member 6 is fixed by the sewn portion a on the base cloth 3a. This method is advantageous in that the manufacturing process is simplified and the air bag can be designed in a lightweight and compact form because fewer components are used.

FIG. 8 shows the last of the above three methods. The same component as in FIG. 5 are referred by the same numbers and symbols, and detailed description is not given here.

As shown in FIG. 8, the suspension member 6 consists of a pair of single straps $6_1$ and $6_2$ of identical shape. This single strap $6_1$ and $6_2$ are formed by two connecting legs 6e and 6e, which integrally extend toward 2 directions, perpendicular to each other, from the sewn portion 6d. With these connecting legs 6e and 6e making a cross and with the sewn portions 6d and 6d partially overlapped on each other in A, these sewn portions 6d and 6d are fixed on the base cloth 3a by the sewn portion a in circular shape. This method is advantageous that the base cloth can be effectively cut and that the manufacturing process is simplified and the air bag can be designed in a lightweight and compact form because fewer components are used.

However, these methods have the following problems:

In the method of FIG. 6, many components are used, and this results in a complicated manufacturing process and high cost. Also, the air bag is heavier in eight, difficult to fold up, and requires a larger space to store.

In the method of FIG. 7, the base cloth cannot be cut effectively and this means higher cost. Also, the strength of the sewn portion of the suspension member 6 is weaker than in the method of FIG. 6.

In the method of FIG. 8, the sewn portions 6d and 6d of a pair of single straps $6_1$ and $6_2$ are partially overlapped with each other, whereas the strength of the sewn portion of the suspension string 6 is weak because the sewn portion a on the overlapping A is small. Also, because the sewn portions 6d and 6d are partially overlapped on each other, the positioning of single straps $6_1$ and $6_2$ is difficult.

To solve the above problems, it is an object of the present invention to offer an air bag, by which the base cloth of the suspension member can be effectively cut and the strength of the sewn portion suspension member can be made stronger.

Another object of the invention is to offer an air bag, which is lightweight and compact, and which can be manufactured by a simplified manufacturing process because few components are used.

SUMMARY OF THE INVENTION

To attain the above objects, the present invention offers an air bag, having a suspension member, which is furnished between the base cloth on the side facing to the person in the vehicle and the base cloth to be fixed on the fixed portion of the car body or between the former base cloth and the fixed portion of car body. The inflated shape of said air bag is maintained in the predetermined shape by said suspension member, characterized in that said suspension member consists of a plurality of single strings, therein said single straps have the sewn portions, which are sewn on the base cloth on the side facing said person in the vehicle, and that all or almost all sewn portions of said single straps are overlapped on each other. These portions are sewn together with the base cloth on the side facing the person in vehicle.

Also, the present invention is characterized in that said single straps are formed in identical shapes.

Further, the present invention is characterized in that said sewn portions of said single straps are formed in a circular or approximately circular shape, wherein said single straps extend toward the perpendicular directions from the sewn portions, and that the tip of said single straps are provided with pairs of connecting legs which are fixed either on a base cloth fixed on the fixed portion of car body or directly on the fixed portion of car body.

According to the invention with such arrangement, the suspension member is composed of a plurality of single straps, and this makes it possible to effectively cut the base cloth when these single straps are manufactured. Because the sewn portions of each single strap are sewn by overlapping on each other, they are sewn on the base cloth within the overlapped sewn portion and his increases the strength of the sewn portion. Further, all of the sewn portions of each single member are overlapped on each other, and this makes it easy to perform correct positioning of each single strap.

According to the present invention, each single strap is formed identically with each other. This makes it possible to cut the base cloth effectively. Because only one type of single strap is manufactured, the suspension member can be produced at low cost.

Further, because said sewn portions of single straps is formed in circular or approximately circular shape, the positioning of the single straps can be performed much easier. Moreover, because of a pair of connecting legs are provided, the suspension members can be formed to make these connecting legs in the form of a cross using a pair of single straps. This makes it possible to manufacture the suspension member with fewer components and by a simplified manufacturing process. Thus, the air bag is manufactured in a lightweight and compact design, and the air bag can have an effective shape to receive the person in a vehicle when inflated.

Still other objects and advantages of the invention will in part be obvious and/or be apparent from the specification.

The invention accordingly comprises the features of the construction, the combinations of elements, and the arrangement of parts which will be exemplified in the construction hereinafter set forth, and the scope of the invention will be indicated in the claims.

DESCRIPTION OF THE PREFERRED EMBODIMENT

In the following, the embodiment of the present invention is described in connection with the drawings.

Figure 5:
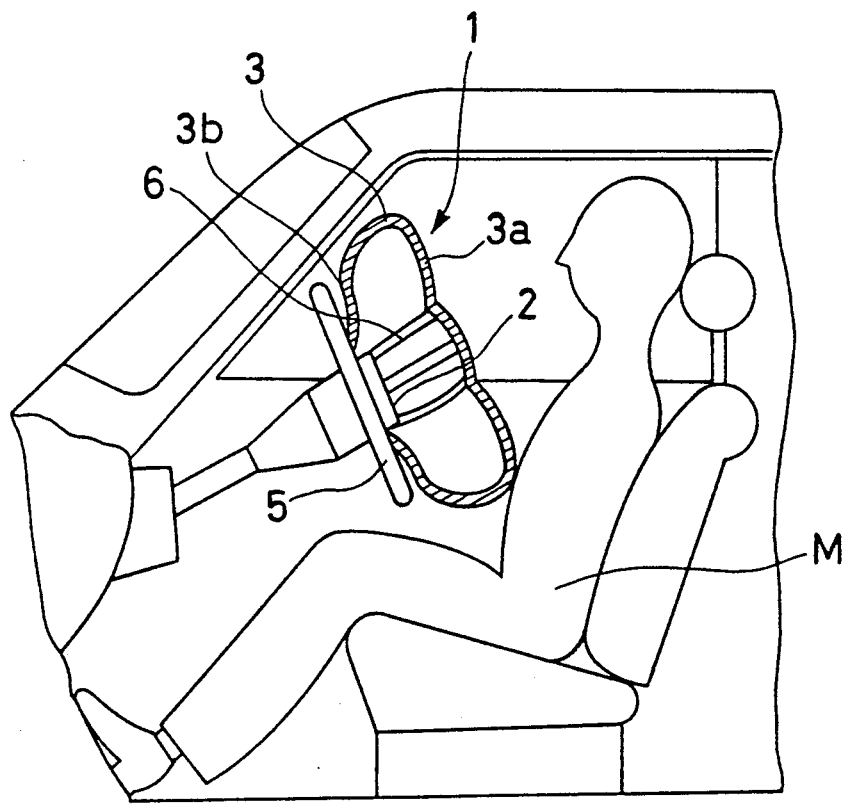
FIG. 5 shows the air bag when it is inflated.
Figure 6A:
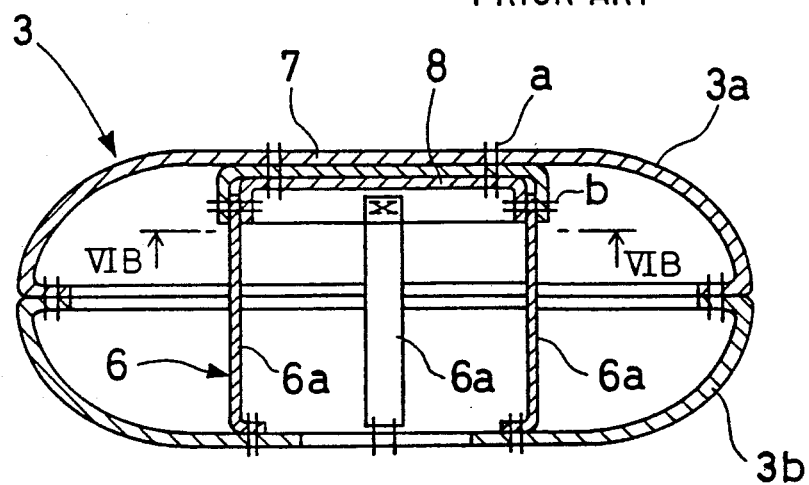
FIG. 6, FIG. 7 and FIG. 8 show the conventional methods to connect single strap on base cloth.
Figure 6B:
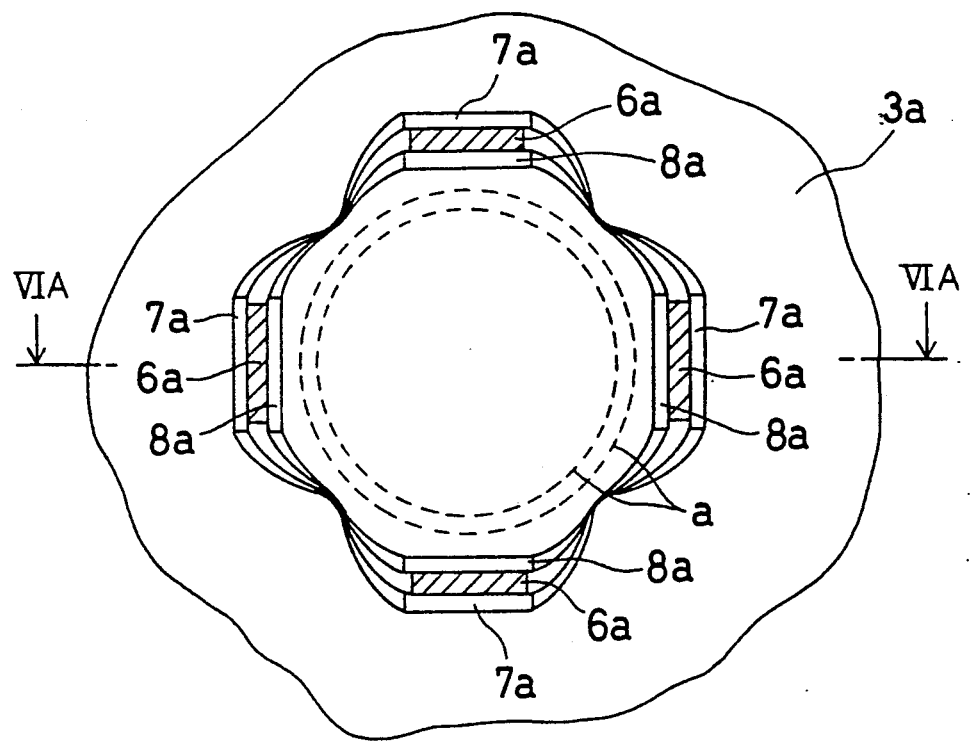
Figure 7A:
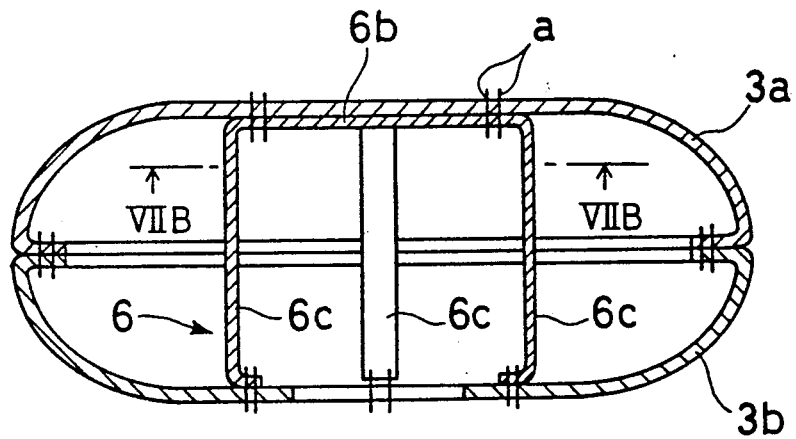
Figure 7B:
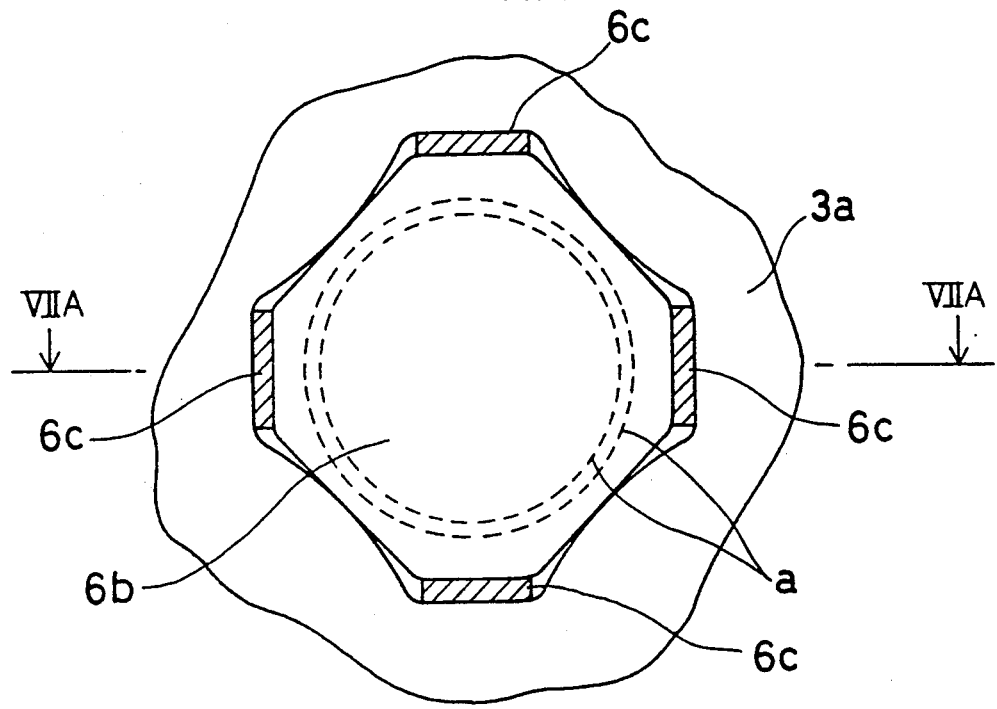
Figure 8A:
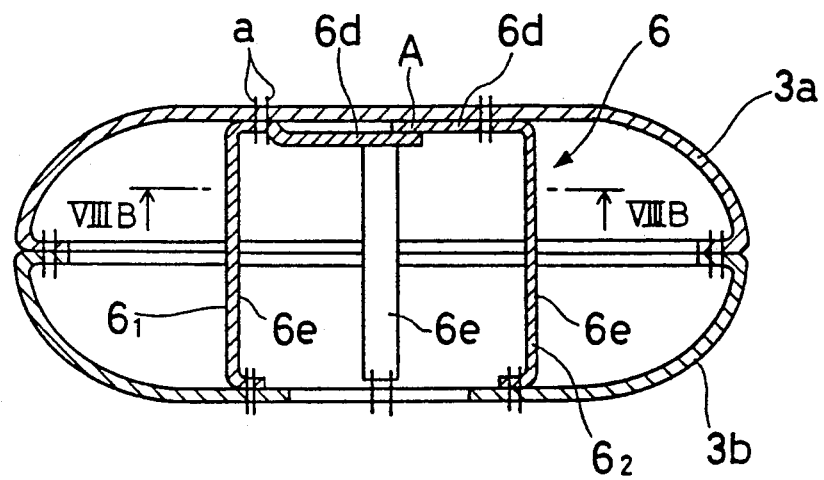
Figure 8B:
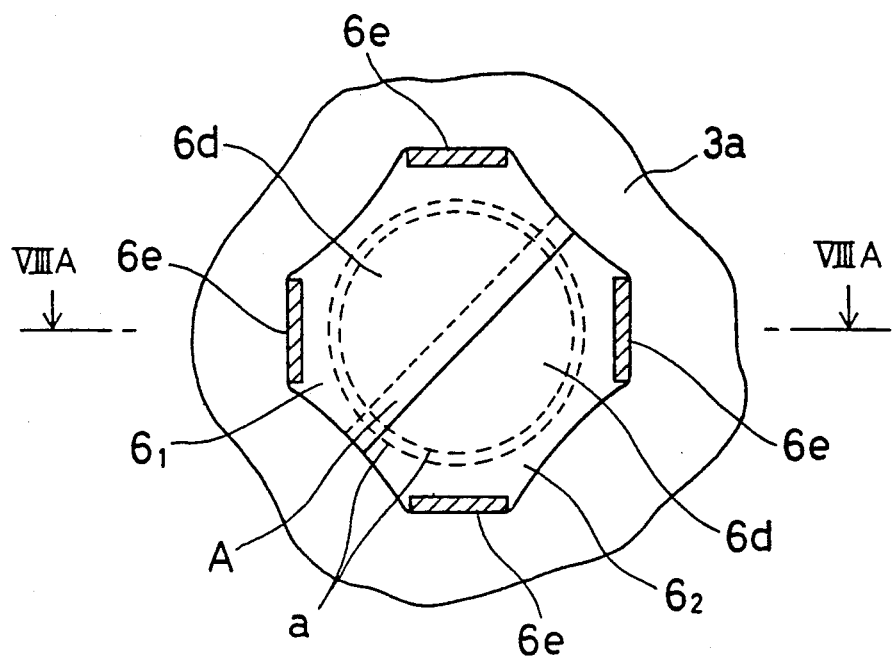

The same components as in FIG. 5 are referred by the same numbers and symbols, and a detailed description will not be given here.

Figure 1:
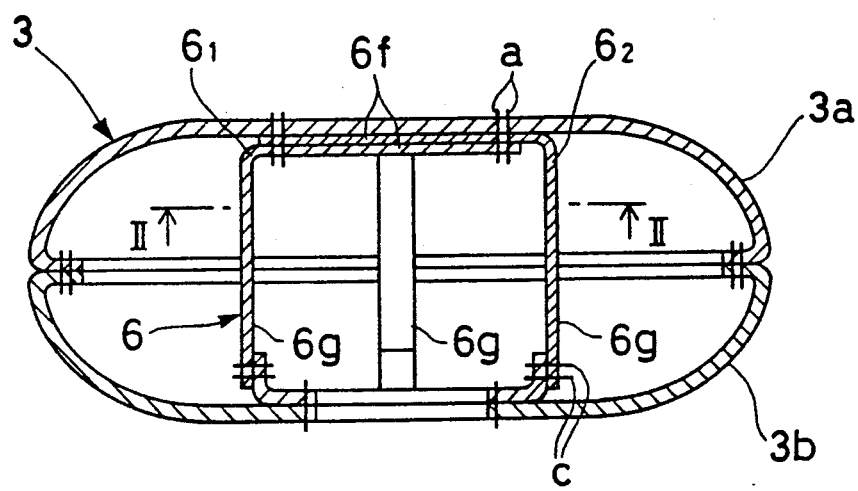
FIG. 1 is a longitudinal sectional view of an embodiment of the air bag according to the present invention.
Figure 3:
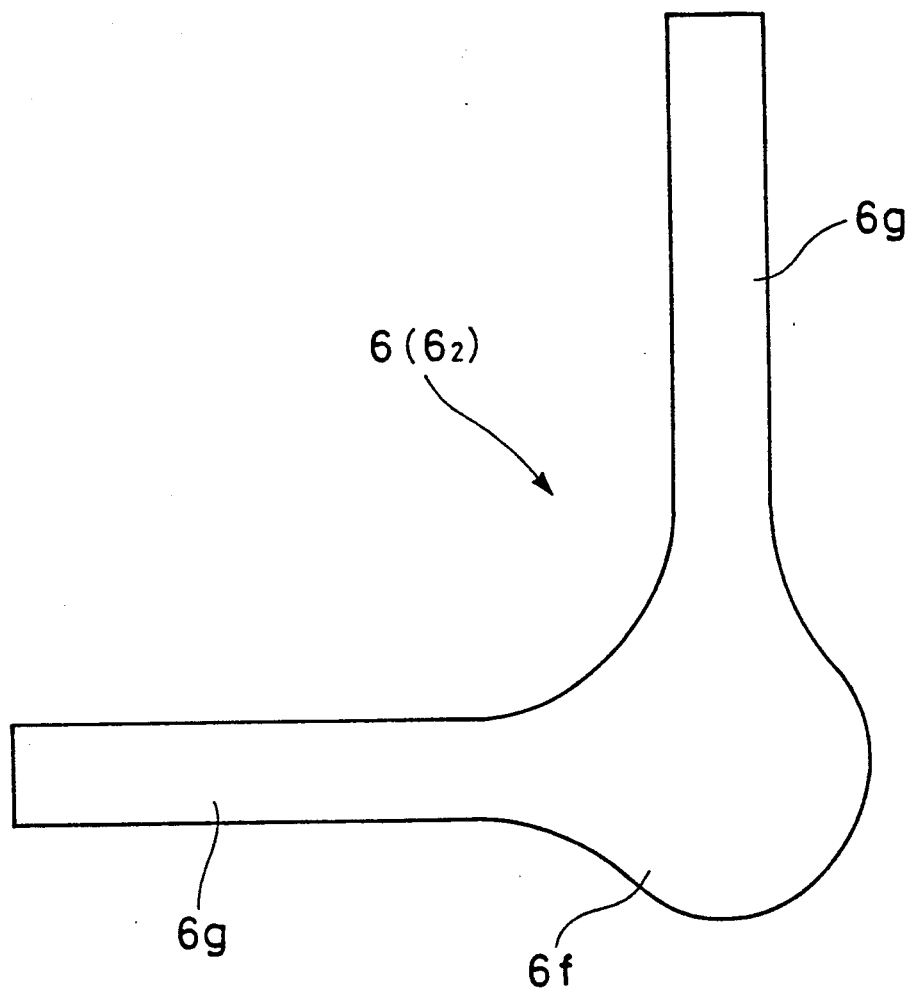
FIG. 3 is a plan view of a single strap used in the embodiment.
Figure 4:
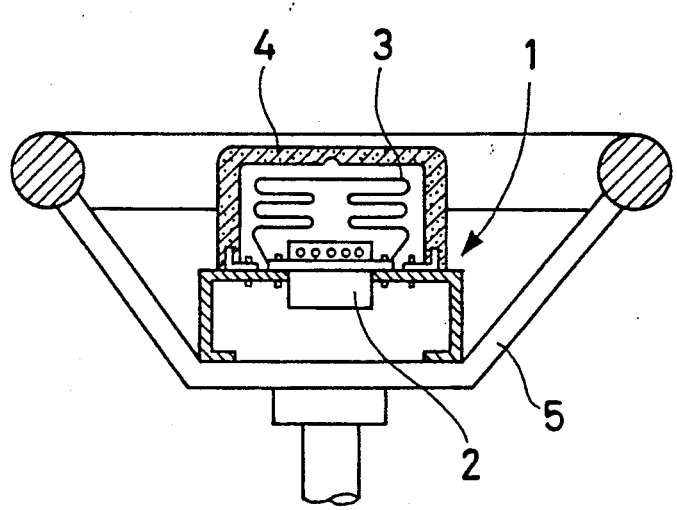
FIG. 4 is a schematical sectional view of an example when the air bag unit is mounted on a steering wheel.

As shown in FIG. 1, a suspension member 6 is connected similarly to the conventional method between the base cloth 3a of the air bag 3 on the side facing the person in the vehicle and the base cloth 3b on the fixed portion of the car body. The suspension member 6 consists of a pair of single straps $6_1$ and $6_2$. As shown in FIG. 3, a pair of single members $6_1$ and $6_2$ are formed identically in shape, and each has a sewn portion 6f of approximately circular shape and a pair of connecting legs 6g and 6g, which extend from the sewn portion 6f in the directions perpendicular to each other.

Figure 2:
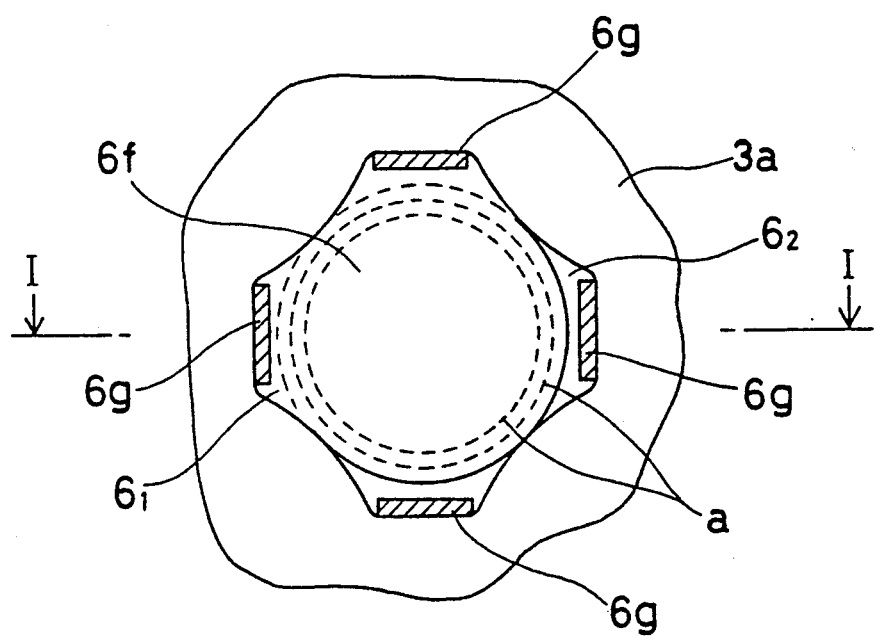
FIG. 2 is a sectional view of the same along the line II—II of FIG. 1.

As shown in FIG. 1 and FIG. 2, the entire sewn portions 6f of these single straps $6_1$ and $6_2$ are over lapped on each other, and two pairs of connecting legs 6g, 6g, . . . , are placed to form a cross. On the overlappings of the sewn portions 6f and 6f, single straps are connected to the base cloth 3a by a circular sewing portion a. Also, the tips of two pairs of connecting legs 6g, 6g, . . . , are connected to the base cloth 3b by the sewing portions c.

In the air bag of such an arrangement, the entire sewn portions 6f and 6f of a pair of single straps $6_1$ and $6_2$ are overlapped on each other. These are connected to the base cloth 3a by the sewing portion a on these overlappings, and the strength of the sewn portions is relatively big. Moreover, because the entire sewn portions of each single strap are overlapped on each other, the positioning of each single member can be performed more easily.

Because the suspension member 6 is composed of a pair of single straps $6_1$ and $6_2$ identical in shape, the base cloth can be effectively cut when these single straps $6_1$ and $6_2$ are manufactured. Further, there is no need to manufacture but one type of single straps $6_1$ and $6_2$, and suspension member 6 can be manufactured at low cost.

Further, said sewn portions 6f and 6f of single straps $6_1$ and $6_2$ are formed in a circular shape, and this makes the positioning of single straps $6_1$ and $6_2$ much easier. Moreover, because suspension strap 6 is formed by making two pairs of connecting legs 6g, 6g, . . . , in the form of a cross using a pair of single straps $6_1$ and $6_2$, the suspension member 6 has relatively fewer components, and this results in a simplified manufacturing process. Thus, the air bag 3 can be manufactured in a lightweight and compact design, and the air bag can have an effective shape for receiving the person in the vehicle when it is inflated.

The present invention is not limited to the above embodiment, and various design modifications can be conceived.

For example, in the above embodiment, a pair of connecting legs 6g and 6g of single straps $6_1$ and $6_2$ are furnished, while the member of the connecting legs 6g may be one or may be three or more. The angle between the connecting legs 6g and 6g can be set to any other than right angles. Further, the sewn portion 6f of single straps $6_1$ and $6_2$ can be formed in ellipse, oval or straps closer to a circular shape.

Additionally, the present invention can naturally be applied to an air bag, in which the tips of two pairs of connecting legs 6g, 6g, . . . , are connected to the fixed portion of the car body.

Further, in case there is no need to worry about the member of components, suspension member may be formed by 3 or more single straps.

As evident from the above description, it is possible according to the air bag of this invention to have higher strength on the sewn portions because the entire sewn portions of a plurality of single straps are overlapped on each other. Because the suspension members are composed of a plurality of single straps, the base cloth can be effectively cut. Because the entire sewn portions can be overlapped, the positioning of the single straps can be performed much easier.

The suspension strings are each composed of a pair of single straps, and this makes it possible to reduce the number of components and also to decrease the number of manufacturing processes. Moreover, the air bag can be manufactured in a lightweight and compact design because fewer components are used.

What we claim is:

1. An air bag comprising:
   a first base cloth located on a side of said air bag facing a person in a vehicle;
   a second base cloth fixed on at least one of a fixed portion of an interior body within the vehicle and between said first base cloth and the fixed portion of the interior body; and
   a suspension member located between said first base cloth and said second base cloth, said suspension member having a plurality of single straps, the single straps having sewn portions which are sewn on said first base cloth, and substantially an entirety of the sewn portions of the single straps being overlapped on each other and sewn together with said first base cloth, and
   further a predetermined shape of said air bag being maintained by said suspension member when inflated.

2. An air bag according to claim 1, wherein the single straps are formed identically in shape relative to each other.

3. An air bag according to claim 2, wherein the sewn portions of the single straps are formed in substantially circular shape, and the single straps extend in perpendicular directions relative to and from the sewn portions, and further tips of the single straps are provided with pairs of connecting legs which are fixed on at least one of the second base cloth fixed on the fixed portion of the interior body of the vehicle and on the fixed portion of the interior body.

* * * * *